(12) United States Patent
Doh et al.

(10) Patent No.: US 11,915,449 B2
(45) Date of Patent: Feb. 27, 2024

(54) METHOD AND APPARATUS FOR ESTIMATING USER POSE USING THREE-DIMENSIONAL VIRTUAL SPACE MODEL

(71) Applicant: Korea University Research and Business Foundation, Seoul (KR)

(72) Inventors: Nak Ju Doh, Seoul (KR); Ga Hyeon Lim, Seoul (KR); Jang Hun Hyeon, Seoul (KR); Dong Woo Kim, Seoul (KR); Bum Chul Jang, Seoul (KR); Hyung A Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 862 days.

(21) Appl. No.: 16/967,181

(22) PCT Filed: Apr. 7, 2020

(86) PCT No.: PCT/KR2020/004685
§ 371 (c)(1),
(2) Date: Aug. 4, 2020

(87) PCT Pub. No.: WO2020/251151
PCT Pub. Date: Dec. 17, 2020

(65) Prior Publication Data
US 2023/0177723 A1    Jun. 8, 2023

(30) Foreign Application Priority Data

Jun. 14, 2019  (KR) .................. 10-2019-0070829
Apr. 1, 2020   (KR) .................. 10-2020-0039564

(51) Int. Cl.
*G06T 7/70*   (2017.01)
*G06T 7/73*   (2017.01)
*G06T 7/194*  (2017.01)

(52) U.S. Cl.
CPC ............... *G06T 7/75* (2017.01); *G06T 7/194* (2017.01); *G06T 2207/10028* (2013.01); *G06T 2207/30196* (2013.01)

(58) Field of Classification Search
CPC . G06T 7/75; G06T 7/194; G06T 2207/10028; G06T 2207/30196;
(Continued)

(56) References Cited

U.S. PATENT DOCUMENTS

2016/0171703 A1* 6/2016 Rhee .................. H04N 23/60
                                                     382/154
2017/0358093 A1   12/2017 Baltsen

FOREIGN PATENT DOCUMENTS

JP   2013-186718 A   9/2013
JP   2014-95553 A    5/2014
(Continued)

OTHER PUBLICATIONS

Ok et al., "Simultaneous Tracking and Rendering: Real-time Monocular Localization for MAVs", IDS (Year: 2016).*
(Continued)

*Primary Examiner* — Qian Yang
(74) *Attorney, Agent, or Firm* — NSIP Law

(57) ABSTRACT

The present invention relates to a method and an apparatus for estimating a user pose using a three-dimensional virtual space model. The method of estimating a user pose including the position and orientation information of a user for a three-dimensional space includes a step of receiving user information including an image acquired in a three-dimensional space, a step of confirming a three-dimensional virtual space model constructed based on spatial information including depth information and image information for the three-dimensional space, a step of generating corresponding information corresponding to the user information in the (Continued)

three-dimensional virtual space model, a step of calculating similarity between the corresponding information and the user information, and a step of estimating a user pose based on the similarity.

20 Claims, 17 Drawing Sheets

(58) Field of Classification Search
CPC . G06T 7/70; G06T 2207/30244; G06V 10/82; G06V 2201/12; G06V 20/20; G06V 40/10; G06V 20/64
See application file for complete search history.

(56) References Cited

FOREIGN PATENT DOCUMENTS

| | | |
|---|---|---|
| JP | 2016-194779 A | 11/2016 |
| JP | 2018-504663 A | 2/2018 |
| JP | 2018-528509 A | 9/2018 |
| KR | 10-2017-0007098 A | 1/2017 |
| KR | 10-2017-0012316 A | 2/2017 |
| KR | 10-2017-0091730 A | 8/2017 |
| KR | 10-2017-0008505 A | 1/2018 |
| KR | 10-1835434 B1 | 3/2018 |
| WO | WO 2018/235219 A1 | 12/2018 |

OTHER PUBLICATIONS

Machine translation for KR 2017-0008505, IDS (Year: 2017).*
Machine translation for KR 2017-0012316, IDS (Year: 2017).*
Ok, Kyel, et al. "Simultaneous tracking and rendering: Real-time monocular localization for MAVs." *2016 IEEE International Conference on Robotics and Automation (ICRA)*. IEEE, (May 1, 2016). pp. 4522-4529.
Henry, Peter, et al. "RGB-D mapping: Using depth cameras for dense 3D modeling of indoor environments." *Experimental robotics*. Springer, Berlin, Heidelberg, (Jan. 1, 2014). pp. 477-491.
Newcombe, Richard A., et al. "Kinectfusion: Real-time dense surface mapping and racking." *2011 10th IEEE international symposium on mixed and augmented reality*. IEEE, (Jan. 1, 2011).
Lee, Tae-jae, et al. "A monocular vision sensor-based efficient SLAM method for indoor service robots." *IEEE Transactions on Industrial Electronics* Vo. 66.No. 1 (Jan. 1, 2019): pp. 318-328.
Extended European Search Report dated Feb. 9, 2022, in counterpart European Patent Application No. 20757508.5 (11 pages in English).
International Search Report dated Jul. 13, 2020 in corresponding International Patent Application No. PCT/KR2020/004685 (3 pages in Korean).
Japanese Office Action dated Dec. 7, 2021, in corresponding Japanese Patent Application No. 2020-548924 (4 pages in Japanese).
Korean Office Action dated Jul. 28, 2021, in corresponding Korean Patent Application No. 10-2020-0039564 (10 pages in Korean).

* cited by examiner

[FIG. 1]
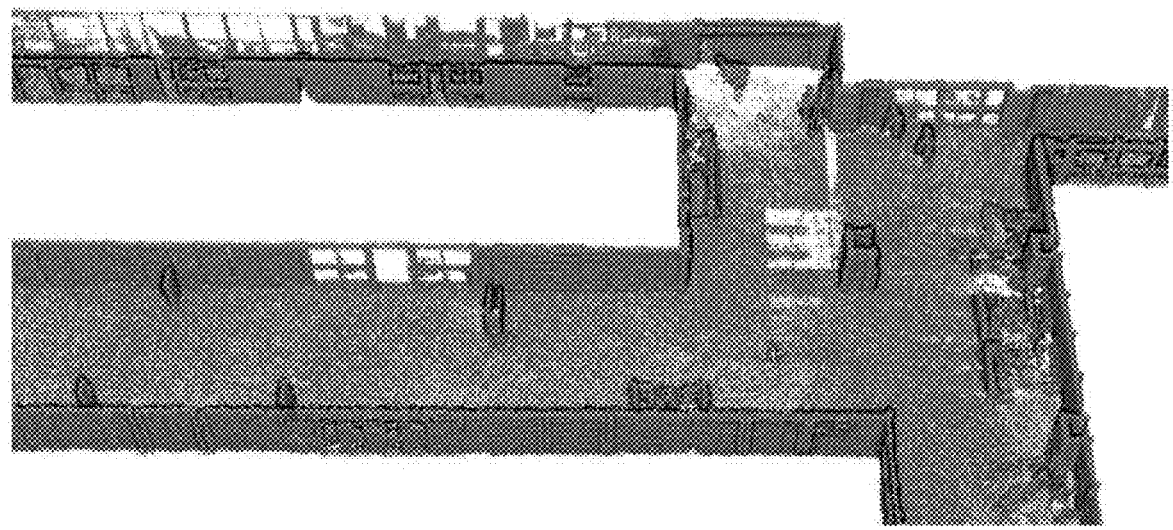

[FIG. 2A]

[FIG. 2B]

[FIG. 2C]
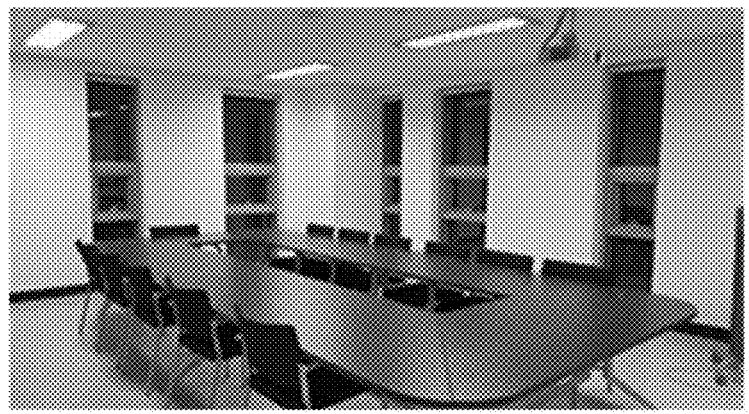

[FIG. 3A]

[FIG. 3B]

[FIG. 4]
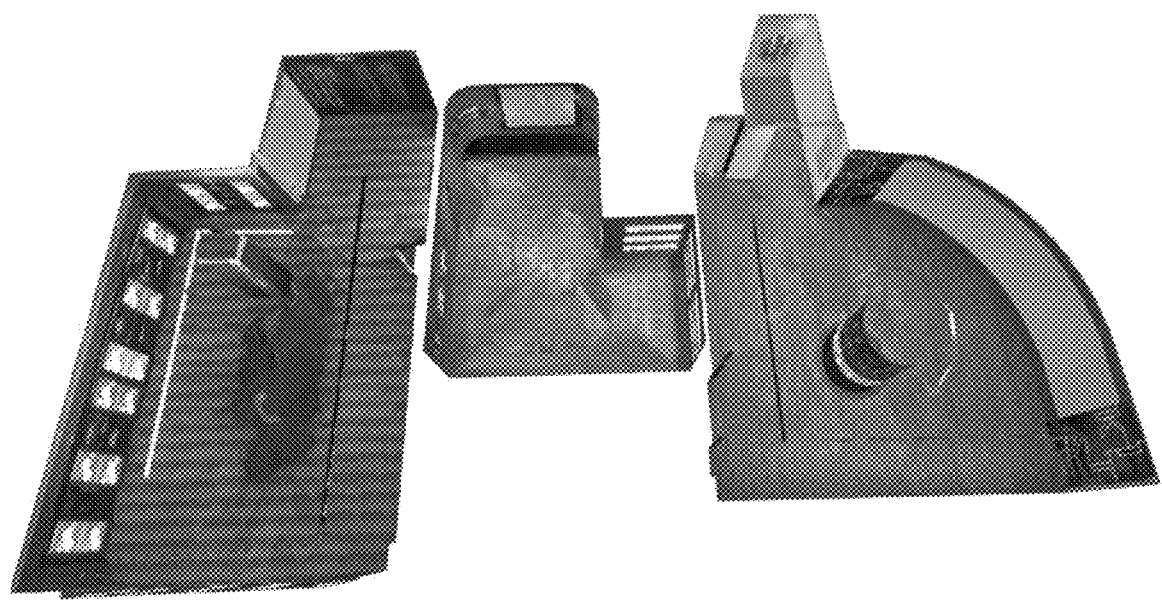

[FIG. 5A]

[FIG. 5B]
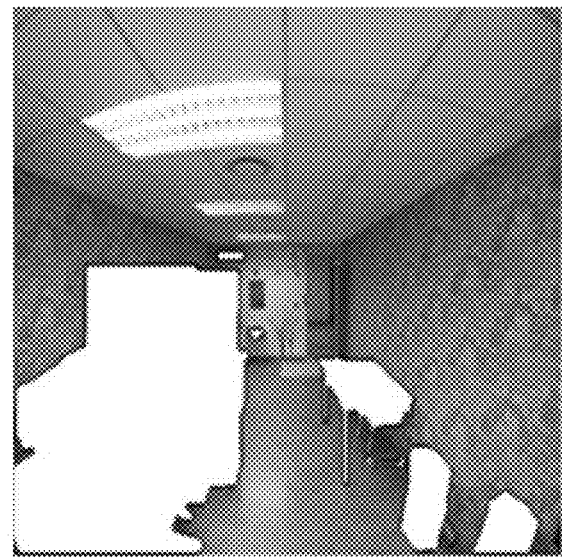

[FIG. 5C]
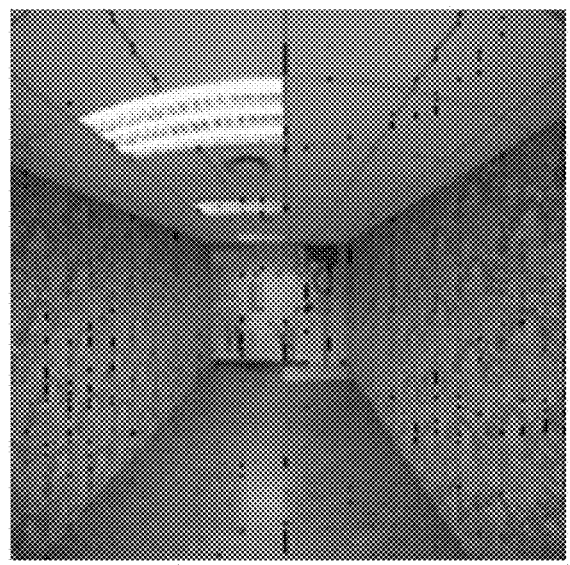

[FIG. 6]
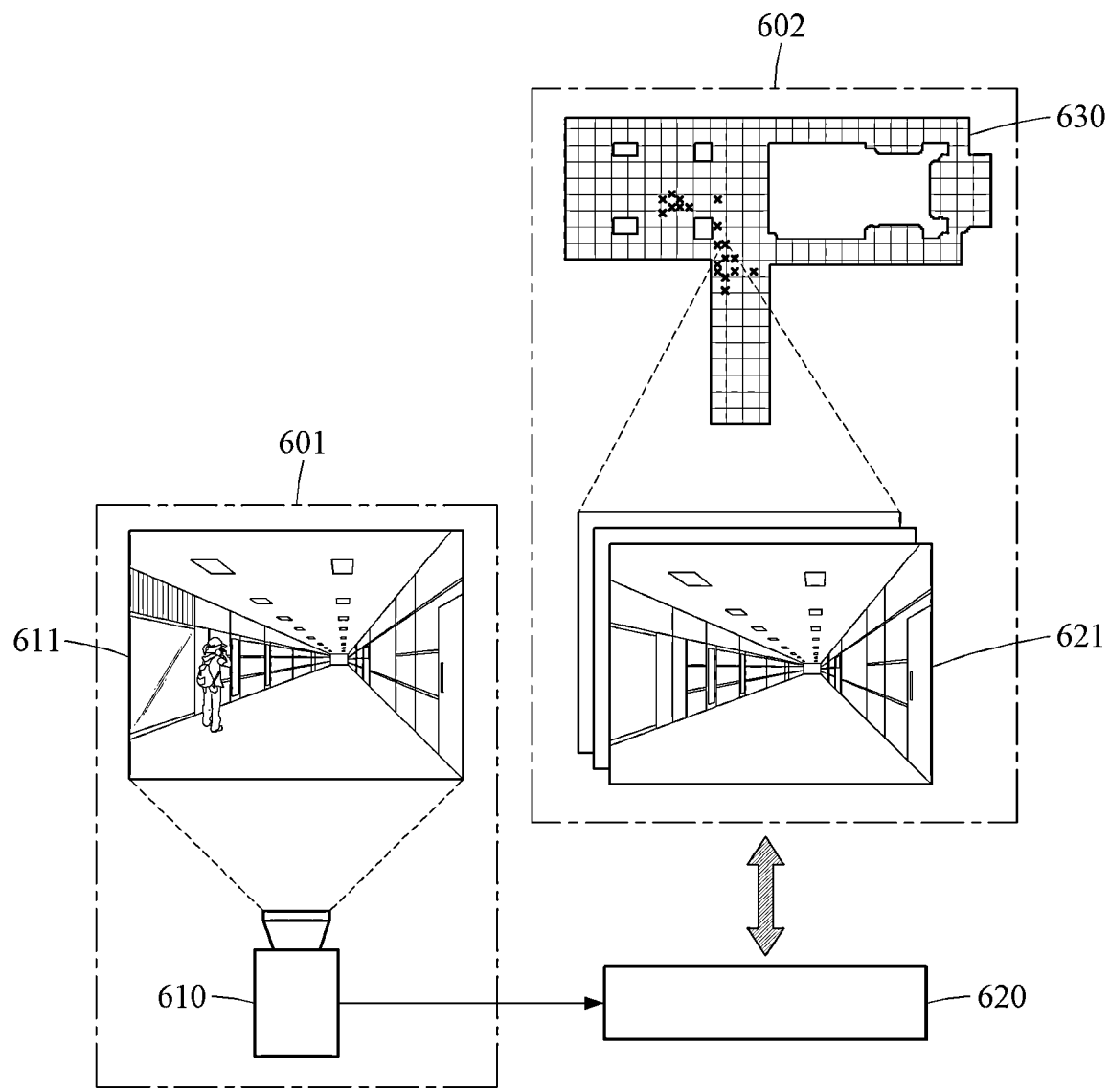

[FIG. 7]
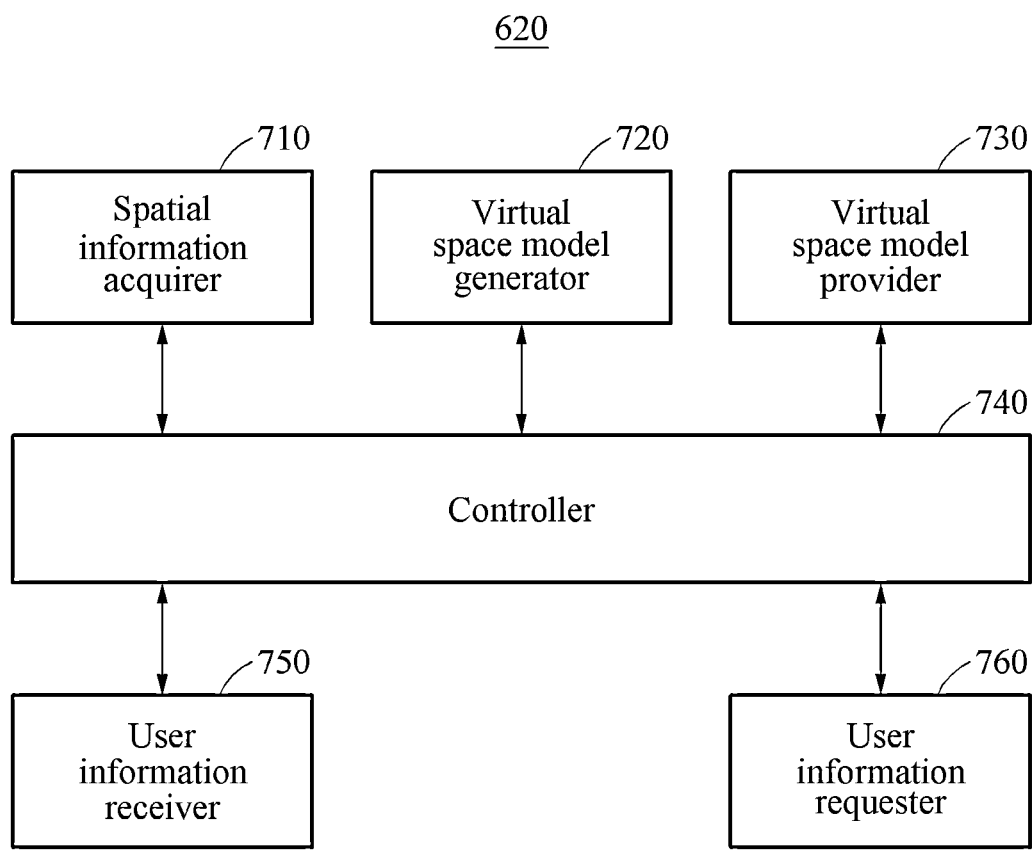

[FIG. 8]
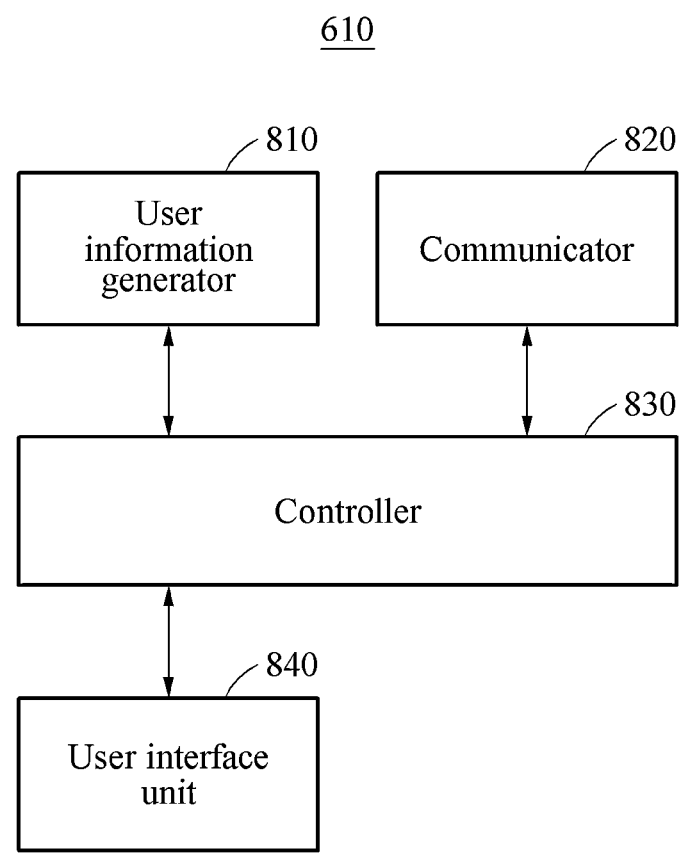

[FIG. 9]
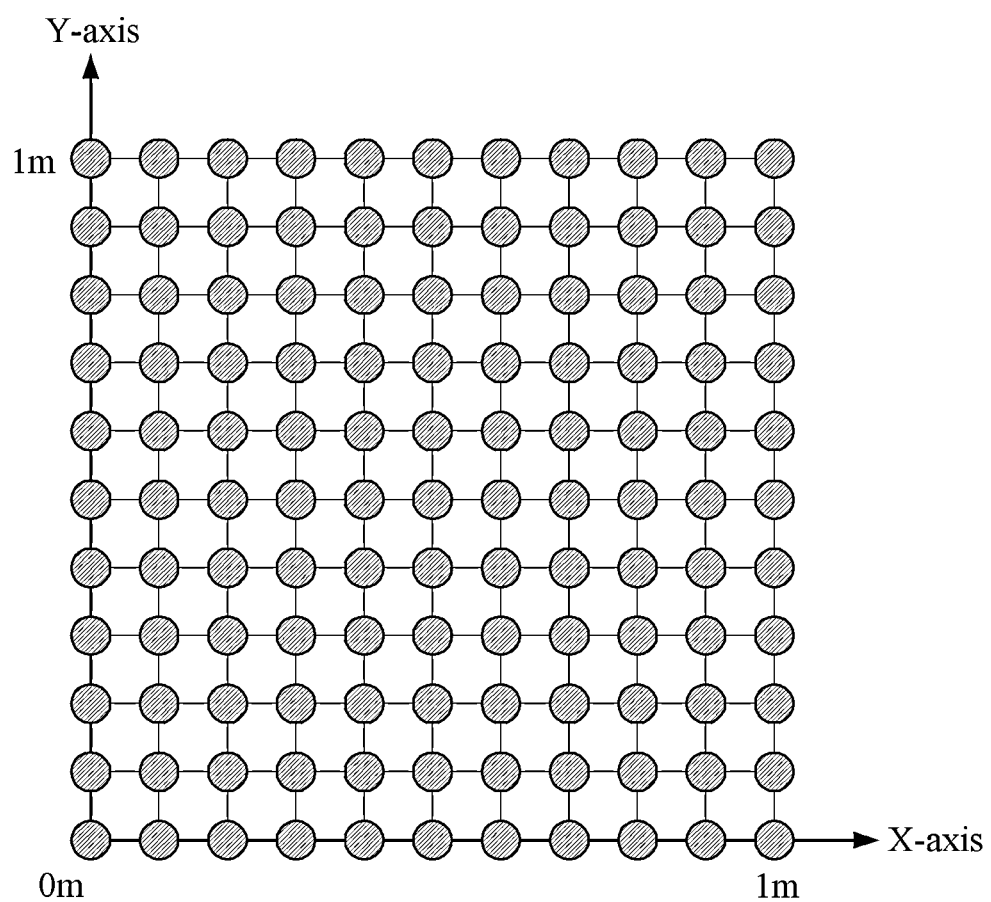

[FIG. 10]
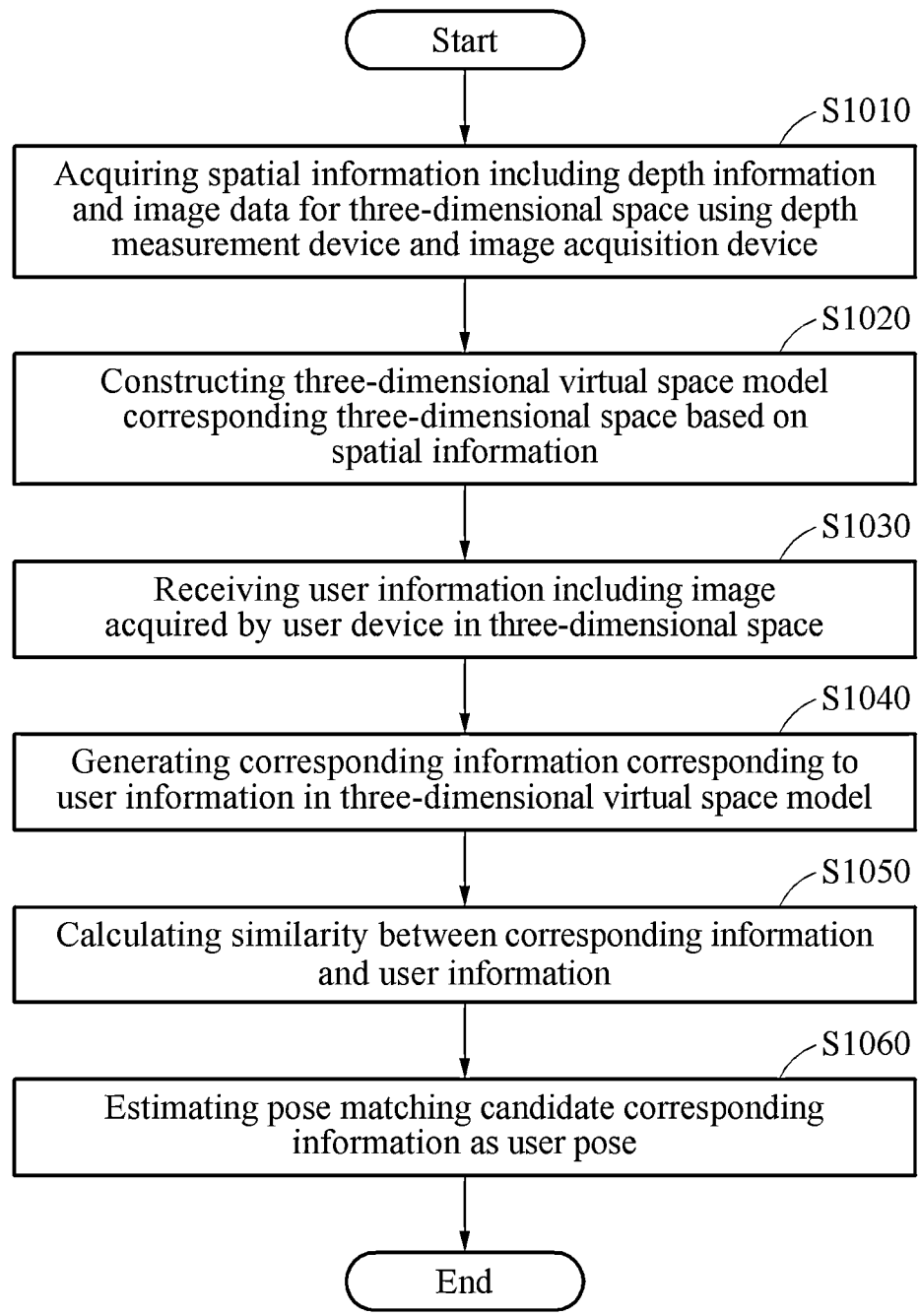

[FIG. 11]
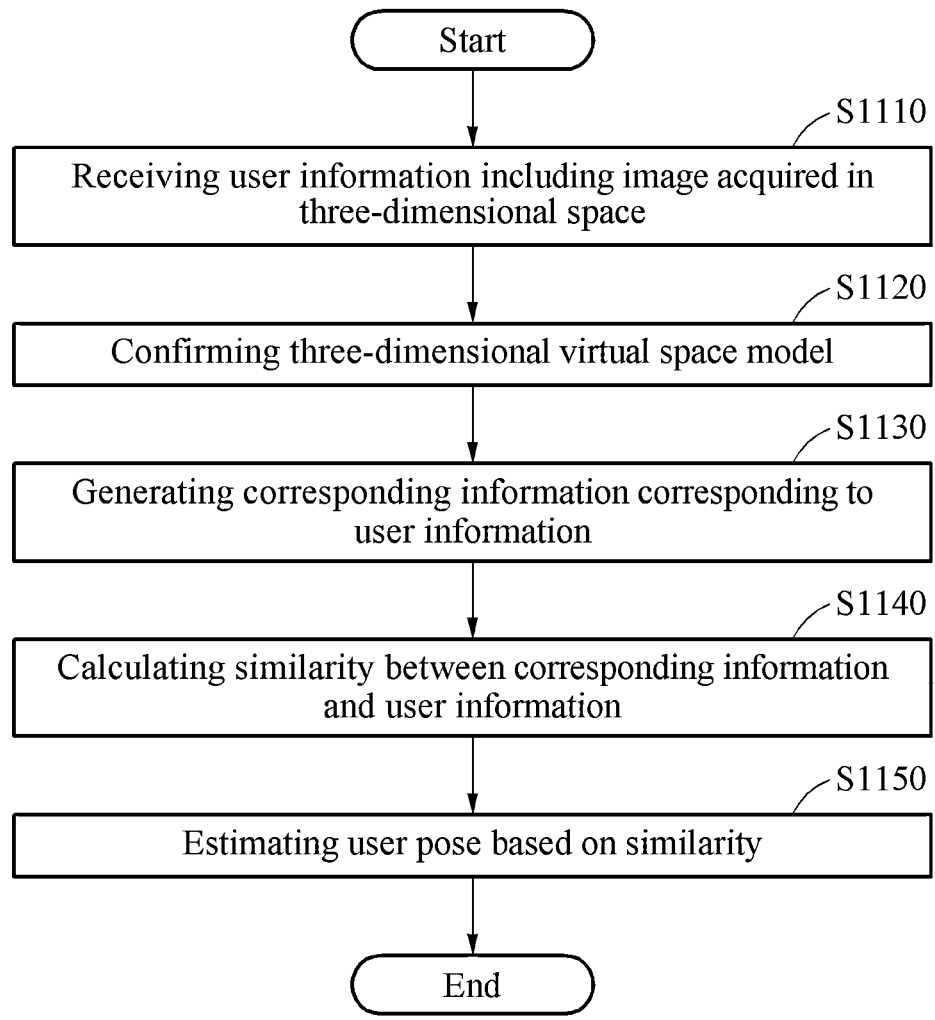

[FIG. 12]
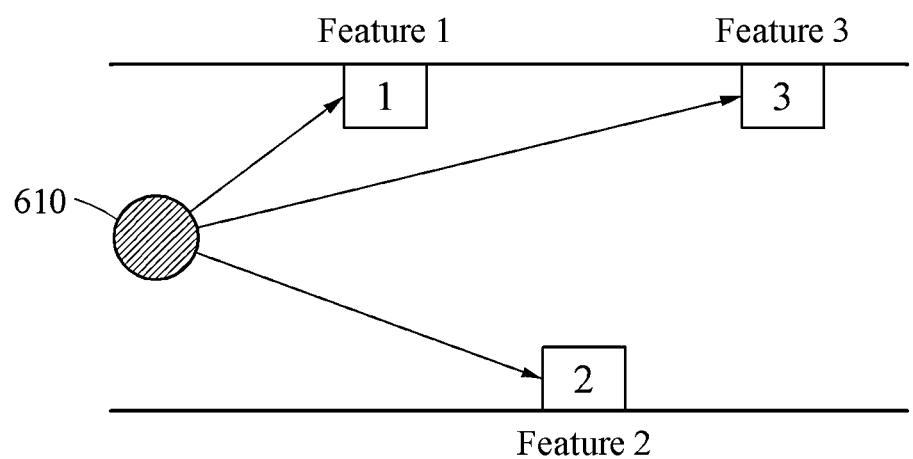

METHOD AND APPARATUS FOR ESTIMATING USER POSE USING THREE-DIMENSIONAL VIRTUAL SPACE MODEL

CROSS-REFERENCE TO RELATED APPLICATIONS

This application is a U.S. National Stage Application of International Application No. PCT/KR2020/004685, filed on Apr. 7, 2020, which claims the benefit under 35 USC 119(a) and 365(b) of Korean Patent Application Nos. 10-2019-0070829 filed on Jun. 14, 2019, and 10-2020-0039564 filed on Apr. 1, 2020, in the Korean Intellectual Property Office, the entire disclosure of which is incorporated herein by reference for all purposes.

TECHNICAL FIELD

The present invention relates to creation and use of a spatial map, and more particularly, to a method and an apparatus for estimating a user pose in a real space using a three-dimensional virtual space model.

BACKGROUND ART

Methods of estimating a user pose using a spatial map include a method of using geometric values, a method of using image values, and a method of mixing and using geometric values and image values.

In the above methods, a spatial map expressing a real space may be constructed by acquiring point cloud using LiDAR or a depth measurement device that operates using an operation principle similar to that of LiDAR, acquiring image information using a camera or an image acquisition device that operates using an operation principle similar to that of the camera, acquiring color-point cloud using Kinect or a depth-image acquisition device that operates using an operation principle similar to that of Kinect, or combinations thereof.

Image information, depth information, and depth-image associated information for a real space may be referred to as "spatial information".

A user pose may be estimated by comparing user information acquired through a user device in a real space with a spatial map.

Here, the "user information" is information including an image acquired through a user device in a real space, and the "pose" is a concept including both a position and an orientation. Thus, the "user pose" may be information including position information and orientation information acquired from image information in a real space.

Meanwhile, existing methods of estimating a user pose using a spatial map have the following problems.

First, a spatial map may be sensitive to a pose responsible for acquiring spatial information. Accordingly, when a spatial map is sensitive to a pose responsible for acquiring spatial information, precision may be reduced when estimating a user pose. For example, in the case of acquiring spatial information from all possible theoretical poses and constructing a spatial map, precision may be increased when estimating a user pose.

However, it is virtually impossible to acquire spatial information from all poses for a real space. To construct a spatial map, when spatial information is acquired from multiple poses using a distribution selected from a real space, sensitivity in estimating a user pose may be reduced by the distribution of poses responsible for acquiring spatial information. However, in this case, system load problems related to acquisition time of spatial information, capacity of spatial information, and processing speed may be caused.

Meanwhile, in the case of acquiring spatial information from a few poses in consideration of the system load problems, a spatial map may not fully express a real space. In addition, when a path for acquiring a spatial map is changed, the reliability of the spatial map is deteriorated, and thus, the real space may not be strongly expressed. The spatial map that cannot strongly express the real space may degrade precision when estimating a user pose.

Second, a discontinuous spatial map may degrade precision when estimating a user pose. FIG. 1 shows an example of a discontinuous spatial map constructed using point cloud.

As shown in FIG. 1, when a spatial map is constructed using point cloud, the point cloud may not be densely acquired depending on spatial information acquisition ranges and spatial information acquisition paths. When the point cloud is not acquired densely, a discontinuous spatial map may be generated, which may degrade precision when estimating a user pose.

Third, due to difference between a time point at which spatial information for constructing a spatial map is acquired and a time point at which user information is acquired, precision may be degraded when estimating a user pose.

FIGS. 2 and 3 are images showing change in a space over time.

FIG. 2 includes images showing that light or illumination changes over time.

More specifically, FIGS. 2A, 2B, and 2C are images showing that the amount of illumination light or light entering from the outside changes over time in the same space.

In addition, FIGS. 3A and 3B are images showing that objects change over time in the same space.

In FIG. 3A, no object is placed on a table 210. In FIG. 3B, various objects are placed on a table 220.

For example, for the space shown in FIG. 2, spatial information for constructing a spatial map may be acquired in FIG. 2A, and user information may be acquired in FIG. 2C. In addition, for the space shown in FIG. 3, spatial information for constructing a spatial map may be acquired in FIG. 3A, and user information may be acquired in FIG. 3B.

As such, due to difference between a time point at which spatial information is acquired and a time point at which user information is acquired for the same space, image information may not match. Accordingly, due to difference between a time point at which spatial information is acquired and a time point at which user information is acquired for the same space, precision may be degraded when estimating a user pose.

In a real space, change in light or illumination, change in person's dynamic movement, and change in an object or an interior may occur over time. When using a spatial map in which these changes are not updated, user information may have little similarity, which may degrade precision when estimating a user pose.

Therefore, a method capable of solving existing problems that occur when estimating a user pose based on a spatial map needs to be developed.

DISCLOSURE

Technical Problem

Therefore, the present invention has been made in view of the above problems, and it is one object of the present invention to provide a method of estimating a user pose using a three-dimensional virtual space model constructed based on spatial information acquired from a real space and user information acquired by a user.

Technical Solution

In accordance with one aspect of the present invention, provided is a method of estimating a user pose for a three-dimensional space, the method including a step of acquiring spatial information including depth information and image information for a three-dimensional space using a depth measurement device and an image acquisition device; a step of configuring depth-image associated information based on the spatial information and constructing a three-dimensional virtual space model corresponding to the three-dimensional space based on the depth-image associated information; a step of receiving user information including an image acquired by a user device in the three-dimensional space; a step of generating corresponding information corresponding to the user information in the three-dimensional virtual space model; a step of calculating a similarity between the corresponding information and the user information; and a step of estimating a user pose based on the similarity.

In step of constructing the three-dimensional virtual space model, a background area related to a structure of the three-dimensional space and a non-background area corresponding to an object placed in the three-dimensional space may be distinguished from each other in the image information for the three-dimensional space, and the three-dimensional virtual space model may be constructed using the background area.

The step of generating the corresponding information may include a step of distinguishing a background area related to a structure of the three-dimensional space from a non-background area corresponding to an object placed in the three-dimensional space in an image included in the user information; a step of processing the user information using the background area of the image included in the user information; and a step of generating corresponding information corresponding to the processed user information in the three-dimensional virtual space model.

The step of calculating the similarity may include a step of regenerating the corresponding information to increase the similarity and a step of recalculating the similarity based on the regenerated corresponding information.

The step of calculating the similarity may include a step of extracting comparison target areas for comparing the user information and the corresponding information; a step of determining a common area between the comparison target area extracted from the user information and the comparison target area extracted from the corresponding information; and a step of regenerating the user information and the corresponding information respectively based on the common area.

The step of calculating the similarity may include a step of acquiring additional user information about a periphery of the user device; and a step of calculating similarity based on the user information and the additional user information.

In the step of estimating the user pose, when user additional information that is additional information used to estimate the user pose is acquired through the user device, the user pose may be estimated using the user additional information along with the user information or the additional user information.

In the step of acquiring the additional user information, guide information for acquiring the additional user information based on the three-dimensional virtual space model may be transmitted to the user device.

The guide information may include a user information acquisition pose for a predetermined feature in the three-dimensional virtual space model, and the step of acquiring the additional user information may be repeatedly performed to increase the similarity.

In accordance with another aspect of the present invention, provided is a method of estimating a user pose for a three-dimensional space, wherein the method is a method of estimating a user pose including position and orientation information of a user for a three-dimensional space, and the method includes a step of receiving user information including an image acquired in the three-dimensional space; a step of confirming a three-dimensional virtual space model constructed based on spatial information including depth information and image information for the three-dimensional space; a step of generating corresponding information corresponding to the user information in the three-dimensional virtual space model, a step of calculating similarity between the corresponding information and the user information, and a step of estimating a user pose based on the similarity.

In accordance with still another aspect of the present invention, provided is an apparatus for estimating a user pose for a three-dimensional space, the apparatus including a spatial information acquirer for acquiring spatial information including depth information and image information for a three-dimensional space; a virtual space model generator for configuring depth-image associated information based on the spatial information and generating a three-dimensional virtual space model corresponding to the three-dimensional space based on the depth-image associated information; a user information receiver for receiving user information including an image acquired by a user device in the three-dimensional space; and a controller including at least one processor configured to generate corresponding information corresponding to the user information in the three-dimensional virtual space model, calculate similarity between the corresponding information and the user information, and estimate the user pose based on the similarity.

The space model generator may distinguish a background area related to a structure of the three-dimensional space from a non-background area corresponding to an object placed in the three-dimensional space in the image information for the three-dimensional space, and may construct the three-dimensional virtual space model using the background area.

The controller may distinguish, in an image included in the user information, a background area related to a structure of the three-dimensional space from a non-background area corresponding to an object placed in the three-dimensional space, may process the user information using the background area of the image included in the user information, and may generate corresponding information corresponding to the processed user information in the three-dimensional virtual space model.

In accordance with still another aspect of the present invention, provided is an apparatus for estimating a user pose for a three-dimensional space, wherein the apparatus is an apparatus for estimating a user pose including position and orientation information of a user for a three-dimensional space, and the apparatus includes a virtual space model provider for providing a three-dimensional virtual space model constructed based on spatial information including depth information and image information for the three-dimensional space; a user information receiver for receiving user information including an image acquired by a user device in the three-dimensional space; and a controller including at least one processor configured to generate corresponding information corresponding to the user information in the three-dimensional virtual space model, calculate similarity between the corresponding information and the user information, and estimate the user pose based on the similarity.

In accordance with yet another aspect of the present invention, provided is an apparatus for estimating a user pose for a three-dimensional space, the apparatus including a user information generator for generating user information including an image for a three-dimensional space; a communicator for transmitting the user information to a user pose estimation server and receiving information about a user pose estimated in a three-dimensional virtual space model from the server; and a controller including at least one processor configured to control operation of the user information generator and the communicator and transmit the information about the user pose to an application or drive system that is currently being driven.

Advantageous Effects

According to embodiments of the present invention, by using a three-dimensional virtual space model as a spatial map, a three-dimensional virtual space model that is robust in a path for acquiring spatial information can be constructed, and the sensitivity of user pose estimation precision according to a spatial information acquisition pose can be reduced.

In addition, although the three-dimensional virtual space model according to an embodiment of the present invention is configured similarly to a real space, spatial information acquisition time, spatial information capacity, and data processing time can be reduced.

In addition, a robust user pose estimation method can also be provided despite change in a real space over time.

In addition, embodiments of the present invention can be used when estimating user poses in mixed reality.

In addition, due to precise user pose estimation, the awkwardness between the real space and the virtual space can be reduced, and user immersion in mixed reality can be increased. Accordingly, embodiments of the present invention can contribute to commercialization and development of technologies related to mixed reality.

DESCRIPTION OF DRAWINGS

FIG. 1 shows an example of a discontinuous spatial map constructed using point cloud.

FIG. 2A, FIG. 2B, and FIG. 2C include images showing change in a space over time.

FIG. 3A and FIG. 3B include other images showing change in a space over time.

FIG. 4 shows an example of a three-dimensional virtual space model according to one embodiment of the present invention.

FIG. 5A, FIG. 5B, and FIG. 5C include images for explaining an example of generating a three-dimensional virtual space model according to one embodiment.

FIG. 6 is a drawing for explaining a system for estimating a user pose using a three-dimensional virtual space model according to one embodiment.

FIG. 7 is a block diagram for explaining the configuration of an apparatus for estimating a user pose for a three-dimensional space according to one embodiment.

FIG. 8 is a block diagram for explaining the configuration of a user device according to one embodiment.

FIG. 9 is a drawing for explaining the concept of a pose according to one embodiment.

FIG. 10 is a flowchart showing a method of estimating a user pose for a three-dimensional space according to one embodiment.

FIG. 11 is a flowchart showing a method of estimating a user pose for a three-dimensional space according to another embodiment.

FIG. 12 is a drawing for explaining a method of acquiring an additional user pose according to one embodiment.

BEST MODE

The present invention will now be described more fully with reference to the accompanying drawings and contents disclosed in the drawings. However, the present invention should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the disclosure and the appended claims, the singular form "a" or "an" is intended to include the plural forms as well, unless context clearly indicates otherwise.

In addition, terms such as "first" and "second" are used herein merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

In addition, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

FIG. 4 shows an example of a three-dimensional virtual space model according to one embodiment of the present invention.

FIG. 5 includes images for explaining an example of generating a three-dimensional virtual space model according to one embodiment.

Referring to FIG. 4, in general, a three-dimensional virtual space model is a model for a real space constructed using depth-image associated information such as 'obj' and 'x3d'. For example, the three-dimensional virtual space model may include a model in which 'obj', 'x3d', generated through Korean Patent No. 10-1835434 (Invention title: METHOD OF GENERATING PROJECTION IMAGE AND APPARATUS FOR GENERATING PROJECTION IMAGE, METHOD OF MAPPING BETWEEN IMAGE PIXEL AND DEPTH VALUE) or a 'TeeVR model'.

In this case, as shown in FIG. 5, to construct a three-dimensional virtual space model according to one embodiment, a background area and non-background areas may be divided, and the three-dimensional virtual space model may be constructed using only the background area.

FIG. 5A shows image information included in spatial information, FIG. 5B shows an image in which the non-background areas are removed, and FIG. 5C shows an example of generating image information by expanding the background area.

For example, the background area may be the structure of a building forming a three-dimensional space or a structure attached to the building, such as a door or a window. Accordingly, in image information, the background area may be defined as an area related to the structure of a three-dimensional space.

In FIG. 5A, areas corresponding to various objects (desk, bookshelf, chair, etc.) located in an indoor space may correspond to the non-background areas. FIG. 5B shows the background area in which the various objects (areas shown in white) located in an indoor space are removed.

The three-dimensional virtual space model is a concept including both indoor and outdoor spaces, and may be an independent indoor space, an independent outdoor space, or a space where an indoor space and an outdoor space are linked. A model (person, object, etc.) such as 'obj' and 'x3d' may be added to the three-dimensional virtual space model, and the three-dimensional virtual space model may be a concept including a three-dimensional virtual space model to which a model is added. In addition, a spatial map may use a two-dimensional virtual space model instead of a three-dimensional virtual space model.

The three-dimensional space model may use a model such as 'obj' and 'x3d' that has been constructed in advance, or may be constructed by acquiring new spatial information. Alternatively, a model that has been constructed may be updated, and the three-dimensional space model may use the updated model. The three-dimensional space model may be judged to be similar to a real space.

FIG. 6 is a drawing for explaining a system for estimating a user pose using a three-dimensional virtual space model according to one embodiment.

Referring to FIG. 6, the system for estimating a user pose using a three-dimensional virtual space model includes a user device 610 and an apparatus 620 for estimating a user pose. The apparatus 620 for estimating a user pose according to one embodiment may be installed in a server (not shown) or the user device 610.

The user device 610 may acquire the user information 611 in a real space 601 and may transmit the user information 611.

The apparatus 620 for estimating a user pose may estimate a user pose using a three-dimensional virtual space model 630 and the user information 611 that are stored in a storage system 602 provided inside or outside the apparatus.

The apparatus 620 for estimating a user pose may accurately estimate a user pose by comparing corresponding information 621 having a high probability of corresponding to the user pose in the three-dimensional virtual space model 630 with the user information 611.

FIG. 7 is a block diagram for explaining the configuration of an apparatus for estimating a user pose for a three-dimensional space according to one embodiment.

Referring to FIG. 7, the apparatus 620 for estimating a user pose for a three-dimensional space according to one embodiment includes a virtual space model provider 730, a controller 740, and a user information receiver 750. In addition, the apparatus 620 for estimating a user pose may further include a spatial information acquirer 710 and a virtual space model generator 720. In addition, the apparatus 620 for estimating a user pose may further include a user information requester 760.

The spatial information acquirer 710 acquires spatial information including depth information and image information for a three-dimensional space. For example, the spatial information may be acquired using a depth measurement device and an image acquisition device.

When the field of view (FoV) of a measurement device composed of the depth measurement device or the image acquisition device for acquiring spatial information for constructing a three-dimensional virtual space model acquires spatial information through a path capable of securing a real space, the three-dimensional virtual space model may be constructed similarly to the real space, and spatial information acquisition time, spatial information capacity, and data processing time may be reduced, thereby improving efficiency.

The image information is a two-dimensional image for a three-dimensional space and may have a form that may be expressed as a two-degree-of-freedom basis vector, and may be in the form of expressing three dimensions in two dimensions, such as a camera or in the form of expressing three-dimensional thermal information as two dimensions by attaching an infrared filter to a camera.

Depth information may have a point shape that may be expressed as a three-degree-of-freedom basis vector, may be acquired using a depth measurement device, and may be estimated using two or more images taken at different locations. Examples of the former include depth information acquired through LiDAR, SONAR, infrared, or a Time-of-Flight (ToF) distance detector, and examples of the latter include depth information acquired through a stereo camera, multiple cameras, an omnidirectional stereo camera, or the like. Meanwhile, when a device such as Kinect, JUMP, PrimeSense, and Project Beyond is used, depth information and image information may be acquired at the same time.

For example, in one embodiment of the present invention, in addition to depth information acquired through a depth measurement device, depth information may be newly estimated through interpolation, and the estimated depth information may be used. More specifically, three or more depth information may be selected from a plurality of acquired depth information, a polygon (including a triangle) mesh may be constructed, and then new depth information may be estimated through interpolation and the depth information may be added inside the polygon mesh.

In addition, acquired depth information and image information according to one embodiment of the present invention may be acquired using an integrated sensor system at the same time. When using multiple measurement devices, a calibration process may be required to obtain coordinate relationships between sensors.

In the process of acquiring spatial information, an inertial measurement unit (IMU) or the like may be additionally used. When measurement is performed using a wheeled mobile robot with a sensor attached, distance information (odometry) may be used. When a real space is wider than the field of view of a measurement device, spatial information may be acquired by rotation or movement of a sensor or a combination thereof. In this case, three-dimensional poses from which individual spatial information is acquired may be different from each other. To estimate poses from which individual spatial information is acquired, simultaneous localization and mapping (SLAM), visual-inertial odometry (VIO), visual odometry (VO), or the like may be used.

In addition, the configuration of spatial information may be different depending on the type of measurement device. For example, when the measurement device is composed of only a single camera, pre-measurement information may consist of camera image information. In the case of a single camera, a relative distance between pixels may be estimated using corresponding image information. In the case of a plurality of cameras, an absolute distance between pixels may be estimated. In particular, in the case of a single camera, the depth of a pixel may be estimated using accumulated image information without extracting features. In the case of a plurality of cameras, the depth of a pixel may be estimated using a plurality of camera images or accumulated image information thereof.

Furthermore, when information such as additional depth information and inertia information is used together, spatial information may be processed according to the unique characteristics of each measurement device. For example, when inertia information is acquired using an inertial measurement unit, the performance of SLAM may be improved using the inertia information, or correction of image acquisition poses may be more easily performed using the inertia information as estimation information about the image acquisition poses when processing image information. In addition, using the acceleration value or angular velocity value of the inertia information, an actual travel distance may be estimated, and these values may be used to correct the scale of depth information extracted from a single camera or a plurality of cameras.

The virtual space model generator 720 configures depth-image associated information based on spatial information, and generates a three-dimensional virtual space model corresponding to the three-dimensional space based on the depth-image associated information.

For example, when a three-dimensional virtual space model about an indoor space is generated, the spatial information acquirer 710 may acquire indoor space images that are spatial information about the indoor space. In this case, the indoor space images may be images taken at various poses inside the indoor space.

In this case, the virtual space model generator 720 may distinguish a background area that is an area corresponding to the structure of an indoor space from a non-background area that is an area corresponding to an object located in the indoor space or a moving person.

The virtual space model generator 720 may distinguish a background area from a non-background area based on the pixel values of an indoor space image.

The background area is partially covered by other elements, so data is not intact, but it can be inferred that the background area may have similarity to the uncovered part, and thus the background area may be an area that may reconstruct the uncovered part using a hole filling or inpainting technique. In addition, the background area may cover other objects, such as a large signboard or an information desk inside a building, but the consistency of an image and geometry information on the edge of the object may be matched within all data or may be matched through a separate matching process.

The virtual space model generator 720 may generate at least one extended indoor space image by expanding a background area to a non-background area in an indoor space image. For example, referring to FIG. 5B, a background area may be extended to region marked in white where non-background areas are removed.

When an edge included in a background area is disconnected at the boundary between the background area and a non-background area, the virtual space model generator 720 may generate an extended image through inference that the extension line of the edge extends beyond the boundary between the background area and the non-background area to the non-background area.

In this case, one or more indoor space images other than a specific indoor space image may be designated as the complementary image of the background, and an area corresponding to the non-background area of the specific indoor space image may be reduced using information of the complementary image of the background.

The virtual space model generator 720 may generate depth-image associated information based on at least one extended indoor space image and geometry information including information on a depth value for an indoor space. The depth-image associated information may be information in which the depth value of the indoor space corresponding to the pixels of the at least one expanded indoor space image is matched.

In addition to at least one extended indoor space image and geometry information, the virtual space model generator 720 may generate depth-image associated information using an image acquisition pose including information about the acquisition position and acquisition angle of each of the at least one extended indoor space image and the geometry information and a depth acquisition pose.

The virtual space model generator 720 generates a three-dimensional virtual space model for a real three-dimensional space using at least one extended indoor space image, geometry information, and depth-image associated information.

When user pose estimation is required, the virtual space model provider 730 provides a three-dimensional virtual space model constructed based on spatial information including depth information and image information for a three-dimensional space.

In this case, user pose estimation may be performed after an application installed in the user device 610 or the apparatus 620 for estimating a user pose is driven. The virtual space model provider 730 may provide a three-dimensional virtual space model to an application running in the user device 610 or the apparatus 620 for estimating a user pose or the drive system of the corresponding device.

The controller 740 may include at least one processor. In this case, the controller 740 may be connected to one or more computer-readable storage media in which instructions or programs are recorded.

Accordingly, the controller 740 includes at least one processor configured to generate corresponding information corresponding to user information in a three-dimensional virtual space model, calculate similarity between the corresponding information and the user information, and estimate a user pose based on the similarity.

User pose estimation according to one embodiment may be performed by learning a three-dimensional virtual space model using deep learning or a neural network.

Depending on the type of learning problems, learning may be classified into reinforcement learning, supervised learning, and unsupervised learning. A vast amount of training data required in a learning stage may be required, and the training data may consist of data including image information, data including a pose in which the data including image information is acquired, and the like. To increase the amount of learning data, noise may be added to the two types of data to modify the data, and the modified data may be used. A convolutional neural network (CNN) or all or part of various neural networks may be used. To improve the performance or speed of deep learning, one or more GPUs may be used, and parallel computation may be performed. The result of deep learning may be expressed as scalar, vector, probability, or the like, and using this result, a user pose estimated as a pose in which user information is acquired may be estimated. The image information of user information may be used as input, and additional user information may be used therewith. When the additional user information is additionally used, a layer may be added to the neural network, functions may be changed, the number of parameters may be adjusted, or the values of parameters may be changed. To construct a neural network, a computer language composed of Python, C-language, MATLAB, or combinations thereof may be used.

When user information is sequentially acquired, a user pose may be estimated using Particle Filter, EKF, EIF, or UKF based on a three-dimensional virtual space model. When inertia information or distance information is acquired as additional user information, an estimated user pose may be corrected. Particle Filter values may converge upon a specific pose according to sequentially acquired user information. In this case, a converged pose may be estimated as a user pose. When estimating a user pose, weights may be imposed, and a user pose may be determined from among multiple convergence poses.

A user pose may be estimated by combining a pose estimated using deep learning and a pose estimated using Particle Filter. For example, a user pose may be estimated by performing Particle Filter around a pose estimated using deep learning, or a user pose may be estimated by performing deep learning around a pose converged with Particle Filter. When estimating a user pose, weights may be imposed, and a user pose may be determined from among multiple convergence poses.

The similarity refers to the degree of similarity between corresponding information generated in a three-dimensional virtual space model and user information. The similarity is proportional to the similarity between the corresponding information and the user information. The pose of a three-dimensional virtual space model in which corresponding information with high similarity is generated may be estimated as a user pose in which user information is acquired. The similarity may be expressed as a scalar, a vector, a covariance matrix, or the like, and may be calculated using Euclidean distance, Manhattan distance, Mahalanobis distance, structural similarity (SSIM), normalized information distance (NID), minimum mean square error (MMSE), entropy, or the like.

More detailed description of similarity calculation and user pose estimation will be given with reference to FIG. 10.

The three-dimensional virtual space model may be constructed by distinguishing, in image information for a three-dimensional space, a background area related to the structure of the three-dimensional space from a non-background area corresponding to an object placed in the three-dimensional space and by using the background area.

The user information receiver 750 receives user information including an image acquired by a user device in a three-dimensional space.

The user information is information including image information, and may be acquired using one or more image acquisition devices, depth measuring devices, or additional devices. When sufficient user information is not acquired due to the narrow field of view of the measuring device, user information may be acquired by rotating, moving, or rotating and moving the measuring device. User information may be acquired by a single or multiple image acquisition devices (cameras), or may be acquired in a pin-hole model, fisheye lens, or a panoramic format. User information may be obtained as single image information, multiple image information, or sequential image information. Image information, depth information, or depth-image associated information, and the like may be configured using acquired user information.

For example, when a single image acquisition device is used, image information may be acquired. When sequentially acquired image information is used, depth information may be calculated. Based on this information, depth-image associated information may be configured.

For example, when a plurality of image acquisition devices is used, depth information may be calculated using the relationship between image information acquired by each image acquisition device and the image acquisition device, and thus depth-image associated information may be configured. The relationship between the image acquisition devices may be the calibration information between the image acquisition devices or the conversion information (homography matrix) between image information acquired by each image acquisition device.

For example, when one or more image acquisition devices and one or more depth measurement devices are used, depth-image associated information may be configured using the calibration information between the two devices. Depth information may be extracted from image information using deep learning. A neural network may be configured, and a convolutional network may be used. A large amount of data for learning and testing may be required, and the neural network may be composed of linear functions, nonlinear functions, and multiple layers, and the results of deep learning may be expressed by probability, scalars, vectors, and the like. Iterative learning may be performed, and parameter tuning may be required. Depth-image associated information may be configured using depth information extracted by deep learning. Processed image information obtained by processing image information may be used. For example, an operation of changing the contrast or saturation of an image or an operation of converting a panoramic image into a rectified image may be performed.

When acquisition of additional user information is required, the user information requester 760 may transmit guide information to the user device 610. Detailed description related to the guide information will be described with reference to FIG. 12.

FIG. 8 is a block diagram for explaining the configuration of a user device according to one embodiment.

Referring to FIG. 8, the user device 610 includes a user information generator 810, a communicator 820, and a controller 830. The user device 610 may further include a user interface 840 including a display, an input means, and an output means for interfacing with a user.

The user information generator 810 generates user information including an image of a three-dimensional space. Accordingly, the user information generator 810 may include at least one of an image acquisition device and a depth measurement device.

The communicator 820 transmits user information to a user pose estimation server, and receives, from the server, information about a user pose estimated in a three-dimensional virtual space model.

In this case, the user pose estimation server may be the apparatus 620 for estimating a user pose shown in FIG. 7, or a separate server for providing a user pose estimation service.

The controller 830 controls operation of the user information generator 810 and the communicator 820, and includes at least one processor configured to transmit information about a user pose to an application or drive system that is currently being driven.

FIG. 9 is a drawing for explaining the concept of a pose according to one embodiment.

Spatial information used to construct a three-dimensional virtual space model may be considered discontinuous information acquired from some poses of a real space. Here, a pose is a concept including both position and orientation. For example, in two dimensions, a pose may be represented by x and y, which are the position of a measurement device, and angle A of the measurement device.

In the example shown in FIG. 9, in a square plane having a horizontal length and vertical length of 1 m each, the measurement device may move at intervals of 10 cm in a range of 0 to 1 m with respect to the x-axis and y-axis, and may rotate by 10 degrees in a rotation angle range of 0 to 360 degrees.

In this case, the number of possible poses is 4, 477 (11×11×37). In addition, in three dimensions, a pose may be expressed by the position (x, y, z) of a sensor and the angle roll, pitch, and yaw of the measuring device.

Assuming that, in a cubic space having a width, depth, and height of 1 m each, the measurement device moves at intervals of 10 cm in a range of 0 to 1 m with respect to the x-axis, y-axis, and z-axis and rotates by 10 degrees in a rotation angle range of 0 to 360 degrees, the number of possible poses is 11×11×11×37×37×19. That is, there may be about 34 million cases.

When the movement interval and rotation angle interval of the measuring device are reduced, discontinuous information may be considered as continuous information. However, in this case, the number of possible poses will increase exponentially. In addition, the volume of a real space is much larger than 1 $m^3$. Accordingly, it is impossible to acquire spatial information in every possible pose.

For the above reasons, in the step of acquiring spatial information, data is acquired in some poses that may sufficiently contain a real space, depth-image associated information is configured based on the acquired spatial information, and a three-dimensional virtual space model is constructed. Thus, spatial information acquired in some poses may be expanded.

The three-dimensional virtual space model may be constructed based on spatial information acquired in some poses. However, since depth-image associated information configured from spatial information is used, spatial information acquired in poses in the same real space or corresponding information similar to configured depth-image associated information may be generated in any pose in the three-dimensional virtual space model.

That is, when a three-dimensional virtual space model is used even in a pose in which spatial information is not acquired, depth-image associated information in a corresponding pose or corresponding information similar to spatial information may be generated. The generated corresponding information may be considered to be similar to depth-image associated information configured from spatial information acquired in the same pose in a real space. The three-dimensional virtual space model may convert spatial information, which is discontinuous information, into corresponding information, which is continuous information.

FIG. 10 is a flowchart showing a method of estimating a user pose for a three-dimensional space according to one embodiment.

The method shown in FIG. 10 may be performed using the apparatus 620 for estimating a user pose shown in FIG. 7.

In step S1010, the apparatus acquires spatial information including depth information and image information for a three-dimensional space using a depth measurement device and an image acquisition device.

In step S1020, the apparatus configures depth-image associated information based on the spatial information, and constructs a three-dimensional virtual space model corresponding to the three-dimensional space based on the depth-image associated information.

In step S1030, the apparatus receives user information including an image acquired by a user device in the three-dimensional space. At this time, the user information may further include depth information for a space corresponding to the acquired image.

In step S1040, the apparatus generates corresponding information corresponding to the user information in the three-dimensional virtual space model.

When the three-dimensional virtual space model is used, even in the case of a pose in which spatial information is not acquired, corresponding information that may be similar to spatial information acquired in a corresponding pose or depth-image associated information may be generated.

The corresponding information may be expressed as depth information, image information, or depth-image associated information. In a pose expressed in a three-degree-of-freedom basis vector in the three-dimensional virtual space model, corresponding information may be generated.

For example, when the height of a user information acquisition pose does not change, corresponding information may be generated in a pose expressed as a two-degree-of-freedom basis vector in a three-dimensional virtual space model. The corresponding information may be generated through field of view conversion, image information conversion, depth information conversion, or the like.

In this case, step S1040 of generating corresponding information may include a step of distinguishing, in an image included in user information, a background area related to the structure of the three-dimensional space from a non-background area corresponding to an object placed in the three-dimensional space, a step of processing the user information using the background area of the image included in the user information, and a step of generating corresponding information corresponding to the processed user information in a three-dimensional virtual space model.

When a user acquires user information in a real space that is the background of a three-dimensional virtual space model, time in the real space may not be the same as the time at which spatial information is acquired to construct the three-dimensional virtual space model, and persons, objects, and interiors in the real space may change.

Accordingly, in user information, a background area may be distinguished from a non-background area, the non-background area may be removed, or user information may be changed using the background area. To remove the effect of illumination, light, or the like, user information may be processed and used. In a process of comparing user information with corresponding information generated in a three-dimensional space model, the form of user information or corresponding information may be changed, and then the process may be performed.

In step S1050, the apparatus calculates the similarity between the corresponding information and the user information.

In this case, the step of calculating the similarity may include a step of regenerating corresponding information to increase the similarity and recalculating the similarity based on regenerated corresponding information. In this case, to increase the similarity includes reacquiring user information, regenerating corresponding information corresponding to the user information, or using additional information in addition to the user information.

Step S1050 of calculating similarity to increase the similarity may include a step of extracting comparison target areas for comparing user information and corresponding information, a step of determining a common area between the comparison target area extracted from the user information and the comparison target area extracted from the corresponding information, and a step of regenerating the user information and the corresponding information respectively based on the common area.

For example, in an area distorted due to structural simplification in corresponding information, a certain area is removed according to a predetermined criterion, and an area corresponding to the non-background area of user information is removed to regenerate corresponding information to be used in a comparison process. In addition, in the user information, the non-background area and the distorted area of the corresponding information are removed to regenerate user information to be used in the comparison process.

A method of calculating the similarity between corresponding information generated in a three-dimensional virtual space model and user information acquired by a user may include a method of comparing the image information of corresponding information and the image information of user information, a method of comparing the depth information of corresponding information and the depth information of user information, or a method of comparing depth-image associated information.

In this case, since the scales of the corresponding information and the user information may be different, normalization or relative comparison may be required.

Meanwhile, when comparing image information, conversion of image information may be required to make the formats of each image information similar to each other. For example, conversion between a panorama image and a rectified image may be performed, the size of image information may be normalized, and the field of view may be changed.

Conversely, a rectified image may be transformed into a panorama format. In two image information, the features of the image information may be found using RANSAC, SIFT, FAST, SURF, or a combination thereof, and similar features may be connected to each other. The features may include edges, straight lines, line segments, corners, circles, ellipses, or combinations thereof, and the scales and degrees of rotation of the features may be different. Similarity between image information may be calculated through feature matching, structural similarity (SSIM), normalized information distance (NID), homography matrix, or the like.

The homography matrix may be calculated using a plurality of pixel coordinates formed by feature matching, and difference (error) between two image information may be calculated using the same. SSIM is a method of calculating similarity between two images, and NID is a probabilistic calculation method.

When depth information is extracted from user information, the depth information of corresponding information and the depth information of user information may be compared to obtain the similarity there between. Depth information may be expressed as three-dimensional point cloud, a depth map, a mesh, or the like, and a process of unifying the two types of depth information formats may be required. In depth information, comparison between pixels (per point) may be performed, and comparison may be performed in consideration of the surrounding area. Through interpolation, depth information may be newly estimated and compared, and depth information may be calculated by assigning weights.

When depth-image associated information is configured from user information, the depth-image associated information of user information may be compared with the depth-image associated information of corresponding information. Depth information and image information may be compared to calculate each similarity, overall similarity may be calculated, and weights may be applied to each similarity. Alternatively, depth-image associated information may be complexly compared, and methods of calculating the similarity between depth information and image information may be combined and used.

Since a time point at which spatial information for constructing a three-dimensional virtual space model is acquired and a time point at which user information is acquired may be different, corresponding information and user information may be different even in the same pose. Accordingly, strong features may be compared in the corresponding information and the user information. For example, a background area and a non-background area may be distinguished in the corresponding information and the user information, and similarity may be calculated using the background area. In addition, corresponding information may be generated in a three-dimensional virtual space model constructed using the background area, and similarity with the background area of user information may be calculated. From the corresponding information and the user information, a light source effect for illumination or light may be removed and similarity may be calculated, and similarity may be calculated by comparing features robust to the light source effect.

In this case, step S1050 of calculating similarity may include a step of acquiring additional user information for the periphery of a user and a step of calculating similarity based on user information and the additional user information. As shown in FIG. 12, guide information may be used to acquire the additional user information.

In step S1060, the apparatus identifies candidate corresponding information having similarity with a value equal to or greater than a preset value, and estimates a pose matching the candidate corresponding information as a user pose.

Similarity is proportional to the identity between the pose of a three-dimensional virtual space model in which corresponding information is generated and a pose in which user information is acquired. In addition, when similarity is greater than a threshold, poses in which two data are acquired and reconstructed may be almost the same, and the threshold value may vary depending on the environment of a real space. In addition, among correspondence information generated from a plurality of candidate poses, correspondence information having the highest similarity to a user pose or a pose selected by a certain determination method may be considered the user pose.

A user pose may be estimated by performing a step of generating corresponding information and calculating similarity only once, or the step may be repeatedly performed. Through repetition of the above step, re-estimation may be accurately performed around a selected pose, re-estimation may be randomly performed for an entire area, and weights may be applied to select a new pose to be re-estimated. This step may be repeated a predetermined number of times, or the step may be repeated until similarity is greater than or equal to a reference value or an estimated pose is converged. An optimization technique may be used to increase similarity.

Corresponding information may be regenerated to increase similarity, and the regenerated corresponding information may be regenerated in a pose expected as a user pose according to similarity with a pose in which existing correspondence information is generated. After corresponding information is regenerated, similarity is calculated and when necessary, the process of regenerating corresponding information and calculating similarity may be repeated.

Corresponding information may be generated and regenerated in a pose in which similarity is expected to be increased by using additional user information such as inertia information and distance information. Thereafter, the similarity between the corresponding information and the user information may be calculated, corresponding information may be regenerated using user additional information when necessary, and a process of calculating similarity may be repeated.

In this case, the user additional information is information that may be helpful in estimating a user pose in addition to image information acquired by a user, and may include inertia information (IMU), distance information (odometry), and the like. For example, when inertia information is acquired using an inertial measurement unit, the inertia information may be used as estimation information for an image acquisition pose when processing image information so that correction of the image acquisition pose may be easily performed.

Accordingly, in step S1050 of calculating similarity or step S1060 of estimating a user pose, when user additional information that is additional information used to estimate the user pose is acquired through the user device, the user pose may be estimated using the user additional information along with the user information or the additional user information.

In this case, using the acceleration value or angular velocity value of the inertia information, an actual travel distance may be estimated, and these values may be used to correct the scale of depth information extracted from a single image acquisition device or a plurality of image acquisition devices.

The distance information may be estimated using visual odometry (VO) and visual-inertial odometry (VIO) configured based on image information acquired by a user. When user information is acquired using a wheeled mobile robot equipped with a measuring device, the distance information may be distance information of the mobile robot. Accordingly, when inertia information is used, correction of distance information extracted using the methods may be performed.

When user information is acquired by a wheeled mobile robot equipped with a sensor instead of a user, the user may operate the mobile robot, the mobile robot may autonomously drive, or a combination thereof may be used to acquire user information. The pose of the mobile robot may be considered a user pose. When the coordinate conversion relationship between the mobile robot and the field of view of a user is known, or when coordinate conversion is possible, the pose of the mobile robot may be converted into a user pose.

In addition to user information including image information, the mobile robot may acquire the distance information (odometry) of the mobile robot as additional user information. A user pose may be corrected using the distance information. The relatively estimated pose of the mobile robot may be estimated using distance information obtained sequentially. Information such as a covariance matrix may be calculated using a technique such as EKF, EIF, UKF, or the like, and a user pose may be corrected by updating this information.

When using a mobile robot, algorithms related to operation, manipulation, movement, and data acquisition, storage, and processing of the mobile robot may be performed on a robot operating system (ROS).

Spatial information, depth-image associated information, a three-dimensional virtual space model, user information, additional user information, and the like may be stored and processed in an external server.

At the same time as spatial information is acquired, depth-image associated information may be configured, and a three-dimensional virtual space model may be constructed. At the same time as user information is acquired, a user pose may be estimated in real time, there may be a latency, or processing may be performed after acquisition of the user pose.

When a three-dimensional virtual space model is constructed, additional spatial information may not be acquired, or additional spatial information may be acquired for some spaces. When additional spatial information is not acquired, the constructed three-dimensional virtual space model may be used. When additional spatial information is acquired, a part or all of the constructed three-dimensional virtual space model may be reconstructed through update and may be used.

After pre-acquiring user information, spatial information may be acquired and a three-dimensional virtual space model may be constructed to estimate a user pose. In addition, after pre-acquiring spatial information for constructing a three-dimensional virtual space model, user information may be acquired to estimate a user pose.

The present invention may be performed in a system in which a sensor system and a computer are fused, or in an independent sensor system and a computer.

When acquiring user information, the pose of each measurement device and the pose of an entire user sensor system may be different, but conversion may be performed using the coordinate conversion relationship between each measurement device and the sensor system. For example, the center or appropriate position of the user sensor system may be assumed as the user pose, or the reference to the user sensor system may be assumed as the user pose. In this case, required calibration information or a relative pose from the user sensor system to the user pose may be known or assumed to be a certain value.

FIG. 11 is a flowchart showing a method of estimating a user pose for a three-dimensional space according to another embodiment.

The method shown in FIG. 11 may be performed using the apparatus 620 for estimating a user pose shown in FIG. 7.

In step S1110, the apparatus receives user information including an image information acquired in a three-dimensional space.

In step S1120, the apparatus checks a three-dimensional virtual space model constructed based on spatial information including depth information and image information for a three-dimensional space. In this case, the three-dimensional virtual space model may be provided by the virtual space model provider 730 shown in FIG. 7.

In step S1130, the apparatus generates corresponding information corresponding to the user information in the three-dimensional virtual space model.

In step S1140, the apparatus calculates the similarity between the corresponding information and the user information.

In step S1150, the apparatus estimates a user pose based on the similarity. In this case, the user pose may be the pose of corresponding information having the highest similarity with the user information.

FIG. 12 is a drawing for explaining a method of acquiring an additional user pose according to one embodiment.

Additional user information may be acquired to increase similarity. A user may be informed of an additional user information acquisition pose using a three-dimensional virtual space model, and the user may acquire additional user information in the pose of which the user has been informed.

Accordingly, as described in FIG. 10, the step of acquiring additional user information may include a step of transmitting guide information for acquiring additional user information based on a three-dimensional virtual space model to the user device 610.

In this case, the guide information may include a user information acquisition pose for a predetermined feature in a three-dimensional virtual space model, and the step of acquiring additional user information may be repeatedly performed in a direction of increasing similarity.

For example, as shown in FIG. 12, in the case of a long corridor with many similar environments, an additional user information acquisition pose may be guided in consideration of features in a three-dimensional virtual space model.

In FIG. 12, the user information acquisition pose may be a pose for sequentially acquiring images for features 1, 2, and 3, or a pose for any one of the features 1, 2, and 3.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

The methods according to the embodiments of the present invention may be implemented in the form of a program command that can be executed through various computer means and recorded in a computer-readable medium. The computer-readable medium can store program commands, data files, data structures or combinations thereof. The program commands recorded in the medium may be specially designed and configured for the present invention or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands Examples of the program commands include machine language code created by a compiler and high-level language code executable by a computer using an interpreter and the like. The hardware devices described above may be configured to operate as one or more software modules to perform the operations of the embodiments, and vice versa.

Although the present invention has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

The invention claimed is:
1. A method of estimating a user pose for a three-dimensional space, comprising:
    a step of acquiring spatial information comprising depth information and image information for a three-dimen- sional space representing a real space using a depth measurement device and an image acquisition device;

a step of configuring depth-image associated information based on the spatial information and constructing a three-dimensional virtual space model corresponding to the real space and the three-dimensional space based on the depth-image associated information;

a step of receiving user information, comprising an image acquired by a user device, in the three-dimensional space;

a step of generating corresponding information corresponding to the user information in the three-dimensional virtual space model;

a step of calculating a similarity between the corresponding information and the user information; and a step of estimating the user pose based on the similarity, wherein the real space is a space, in which a discontinuous spatial map is generated when a spatial map is constructed using point cloud information, wherein the real space comprises at least one of an indoor space, an outdoor space, and a space, in which the indoor space and outdoor space are linked, and wherein the step of estimating the user pose comprises, identifying a plurality of candidate poses and corresponding information for an entire area;

recalculating the similarity around a candidate pose of the plurality of candidate poses using the corresponding information;

repeating the recalculation for all of the plurality of candidate poses; and estimating the user pose as one pose around the candidate pose with the highest similarity during the recalculation.

2. The method according to claim 1, wherein, the step of constructing the three-dimensional virtual space model, a background area related to a structure of the three-dimensional space and a non-background area corresponding to an object placed in the three-dimensional space are distinguished from each other in the image information for the three-dimensional space, and the three-dimensional virtual space model is constructed using the background area.

3. The method according to claim 1, wherein the step of generating the corresponding information comprises:

a step of distinguishing a background area related to a structure of the three-dimensional space from a non-background area corresponding to an object placed in the three-dimensional space in an image comprised in the user information;

a step of processing the user information using the background area of the image comprised in the user information; and a step of generating corresponding information corresponding to the processed user information in the three-dimensional virtual space model.

4. The method according to claim 1, wherein the step of calculating the similarity comprises:

a step of regenerating the corresponding information to increase the similarity; and a step of recalculating the similarity based on the regenerated corresponding information.

5. The method according to claim 1, wherein the step of calculating the similarity comprises:

a step of extracting comparison target areas for comparing the user information and the corresponding information;

a step of determining a common area between the comparison target area extracted from the user information and the comparison target area extracted from the corresponding information; and a step of regenerating the user information and the corresponding information respectively based on the common area.

6. The method according to claim 1, wherein the step of calculating the similarity comprises:

a step of acquiring additional user information about a periphery of the user device; and a step of calculating similarity based on the user information and the additional user information.

7. The method according to claim 6, wherein, in the step of estimating the user pose, when user additional information that is additional information used to estimate the user pose is acquired through the user device, the user pose is estimated using the user additional information along with the user information or the additional user information.

8. The method according to claim 6, wherein, in the step of acquiring the additional user information, guide information for acquiring the additional user information based on the three-dimensional virtual space model is transmitted to the user device.

9. The method according to claim 8, wherein the guide information comprises a user information acquisition pose for a predetermined feature in the three-dimensional virtual space model, and the step of acquiring the additional user information is repeatedly performed to increase the similarity.

10. A method of estimating a user pose for a three-dimensional space, wherein the method is a method of estimating a user pose comprising position and orientation information of a user for a three-dimensional space, and the method comprises:

a step of receiving user information comprising an image acquired in the three-dimensional space representing a real space;

a step of confirming a three-dimensional virtual space model corresponding to the real space constructed based on spatial information comprising depth information and image information for the three-dimensional space;

a step of generating corresponding information corresponding to the user information in the three-dimensional virtual space model;

a step of calculating similarity between the corresponding information and the user information; and a step of estimating the user pose based on the similarity, wherein the real space is a space, in which a discontinuous spatial map is generated when a spatial map is constructed using point cloud information, wherein the real space comprises at least one of an indoor space, an outdoor space, and a space, in which the indoor space and outdoor space are linked, and wherein the step of estimating the user pose comprises, identifying a plurality of candidate poses and corresponding information for an entire area;

recalculating the similarity around a candidate pose of the plurality of candidate poses using the corresponding information;

repeating the recalculation for all of the plurality of candidate poses; and estimating the user pose as one pose around the candidate pose with the highest similarity during the recalculation.

11. The method according to claim 10, wherein the three-dimensional virtual space model is constructed by distinguishing, in image information for the three-dimensional space, a background area related to a structure of the three-dimensional space from a non-background area corresponding to an object placed in the three-dimensional space and by using the background area.

12. The method according to claim 10, wherein the step of generating the corresponding information comprises:
   a step of distinguishing a background area related to a structure of the three-dimensional space from a non-background area corresponding to an object placed in the three-dimensional space in an image comprised in the user information;
   a step of processing the user information using the background area of the image comprised in the user information; and
   a step of generating corresponding information corresponding to the processed user information in the three-dimensional virtual space model.

13. The method according to claim 10, wherein the step of calculating the similarity comprises:
   a step of regenerating the corresponding information to increase the similarity; and
   a step of recalculating the similarity based on the regenerated corresponding information.

14. The method according to claim 10, wherein the step of calculating the similarity comprises:
   a step of extracting comparison target areas for comparing the user information and the corresponding information;
   a step of determining a common area between the comparison target area extracted from the user information and the comparison target area extracted from the corresponding information; and
   a step of regenerating the user information and the corresponding information respectively based on the common area.

15. The method according to claim 10, wherein the step of calculating the similarity comprises:
   a step of acquiring additional user information about a periphery of the user device; and
   a step of calculating similarity based on the user information and the additional user information.

16. The method according to claim 15, wherein, in the step of estimating the user pose, when user additional information that is additional information used to estimate the user pose is acquired through the user device, the user pose is estimated using the user additional information along with the user information or the additional user information.

17. The method according to claim 15, wherein, in the step of acquiring the additional user information, guide information for acquiring the additional user information based on the three-dimensional virtual space model is transmitted to the user device.

18. The method according to claim 17, wherein the guide information comprises a user information acquisition pose for a predetermined feature in the three-dimensional virtual space model, and the step of acquiring the additional user information is repeatedly performed to increase the similarity.

19. An apparatus for estimating a user pose for a three-dimensional space, wherein the apparatus is an apparatus for estimating a user pose comprising position and orientation information of a user for a three-dimensional space, and the apparatus comprises:
   a memory configured to store computer-readable instructions: and one or more processors configured to execute the computer-readable instructions such that the one or more processors are configured to,
   provide a three-dimensional virtual space model corresponding to a real space constructed based on spatial information comprising depth information and image information for the three-dimensional space;
   receive user information comprising an image acquired by a user device in the three-dimensional space; and
   generate corresponding information corresponding to the user information in the three-dimensional virtual space model, calculate similarity between the corresponding information and the user information, and estimate the user pose based on the similarity,
   wherein the real space is a space, in which a discontinuous spatial map is generated when a spatial map is constructed using point cloud information,
   wherein the real space comprises at least one of an indoor space, an outdoor space, and a space, in which the indoor space and outdoor space are linked, and
   wherein the step of estimating the user pose comprises,
   identifying a plurality of candidate poses and corresponding information for an entire area;
   recalculating the similarity around a candidate pose of the plurality of candidate poses using the corresponding information;
   repeating the recalculation for all of the plurality of candidate poses; and
   estimating the user pose as one pose around the candidate pose with the highest similarity during the recalculation.

20. The apparatus according to claim 19, wherein the three-dimensional virtual space model is constructed by distinguishing, in image information for the three-dimensional space, a background area related to a structure of the three-dimensional space from a non-background area corresponding to an object placed in the three-dimensional space and by using the background area.

* * * * *